(12) United States Patent
Yang

(10) Patent No.: US 7,486,527 B1
(45) Date of Patent: Feb. 3, 2009

(54) FIXING DEVICE

(75) Inventor: Chun-Ying Yang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/846,441

(22) Filed: Aug. 28, 2007

(51) Int. Cl.
*H05K 7/12* (2006.01)

(52) U.S. Cl. .................. 361/801; 361/732; 361/740; 361/741; 361/747; 361/759; 312/223.2

(58) Field of Classification Search ............. 361/726, 361/732, 740, 741, 747, 759, 801, 802; 312/223.2, 312/223.3
See application file for complete search history.

(56) References Cited

U.S. PATENT DOCUMENTS

| 5,594,627 | A | * | 1/1997 | Le ........................ 361/801 |
| 5,947,571 | A | * | 9/1999 | Ho ........................ 312/265.6 |
| 5,982,627 | A | * | 11/1999 | Haughton et al. ........... 361/759 |
| 6,430,056 | B1 | * | 8/2002 | Chen ...................... 361/759 |
| 6,515,867 | B2 | * | 2/2003 | Sheng-Hsiung et al. ..... 361/759 |
| 6,700,791 | B1 | * | 3/2004 | Zappacosta ................ 361/759 |
| 6,937,467 | B2 | * | 8/2005 | Hsu ....................... 361/686 |
| 6,972,370 | B2 | * | 12/2005 | Wang et al. ................ 174/535 |
| 7,002,811 | B2 | * | 2/2006 | Jing et al. ................. 361/801 |
| 7,110,251 | B2 | * | 9/2006 | Wu ........................ 361/685 |
| 7,130,200 | B1 | * | 10/2006 | Liu ........................ 361/801 |
| 7,227,760 | B1 | * | 6/2007 | Chang .................... 361/801 |
| 7,251,143 | B2 | * | 7/2007 | Magnoux et al. ........... 361/801 |
| 7,265,997 | B2 | * | 9/2007 | Jing ....................... 361/801 |

FOREIGN PATENT DOCUMENTS

TW         M303591         6/1995

* cited by examiner

*Primary Examiner*—Dameon E Levi
(74) *Attorney, Agent, or Firm*—Workman Nydegger

(57) ABSTRACT

A fixing device is disposed in a case of a computer for fixing at least one interface card. The interface card is installed to a circuit board through an installation path. The fixing device includes a plate and a pressing element. The plate is disposed in the case, or is part of the case. The pressing element having at least one groove is movably disposed on the plate to be moved between a fixing position and an installing position. When the pressing element is moved to the fixing position, the pressing element presses the interface card. When the pressing element is moved to the installing position, the groove overlaps the installation path for the interface card to pass through.

11 Claims, 4 Drawing Sheets

FIXING DEVICE

BACKGROUND OF THE INVENTION

1. Field of Invention

The present invention relates to fixing of interface cards, and more particularly to a fixing device capable of fixing a plurality of interface cards at the same time.

2. Related Art

Computers available in the market, including desktop computers, laptop computers, or servers, have their hardware functions expanded through computer peripheral hardware, e.g. peripheral component interconnect card (PCI card). The interface card is fixed in the case of a computer, and is electrically connected with the computer, such that the computer communicates and transmits signals with the interface card, so as to execute preset functions of the peripheral hardware. A conventional computer usually has a plurality of PCI cards, such as display card, sound card, network card, USB interface card, and memory, for expanding functions of the computer.

An interface card mainly includes a printed circuit board and a baffle disposed at a rear end of the printed circuit board. The portion where the rear end of the circuit board of the interface card is connected to the baffle is usually fixed on a back plate of the case, thereby fixing the interface card, and the rear end of the interface card will not be disengaged from an expansion slot of the motherboard of the computer. However, the front end of the interface card is not fixed to the case, so the interface card is liable to be disengaged from the expansion slot of the motherboard through the front end under vibration or external force.

Therefore, in order to firmly fix the interface card in the expansion slot of the motherboard, various fixing devices for fixing the front end of the circuit board of the interface card have been proposed, so as to fix the front end of the interface card. For example, Taiwan Utility Model No. M303591 disclosed a mounting device, which has a fixing member disposed on to the case of the computer. The fixing member has a slim receiving slot for receiving a front end edge of the interface card to fix the interface card. In the fixing device disclosed in the No. M303591, a single fixing member can only fix a single interface card, and cannot fix two and more interface cards at the same time. Therefore, a computer with a plurality of interface cards always requires fixing members of the same number, so as to fix every interface card. In this manner, not only large amount of assembly time are spent for disposing a fixing member for each interface card one by one, but also plenty of parts are consumed, thus greatly increasing the manufacturing cost.

SUMMARY OF THE INVENTION

Accordingly, the object of the present invention is directed to provide a fixing device, for solving the problem of consuming plenty of parts and large amount of assembly time for fixing the interface cards in the prior art.

In order to achieve the above object, the present invention provides a fixing device, which is disposed in a case of a computer for fixing at least one interface card. The interface card is installed to a circuit board in the case through an installation path. The fixing device includes a plate and a pressing element. The plate is disposed in the case, or is part of the case. The pressing element has at least one groove and is movably disposed on the plate, for being moved between a fixing position and an installing position. When the pressing element is moved to the fixing position, the pressing element presses the interface card. When the pressing is moved to the installing position, the groove overlaps the installation path for the interface card to pass through. The pressing element of the present invention may a plurality of grooves, so that the pressing element may press or release a plurality of interface cards at the same time.

The advantages of the present invention are that the fixing device fixes a plurality of interface cards at the same time by using only a single part disposed on the board, therefore, the procedure of fixing the interface card is greatly simplified, while the time spent for assembling and fixing the interface card is also saved, thereby improving the production performance; moreover, the fixing device of the present invention saves the parts used to fix the interface card, thereby reducing the cost of manufacturing and production.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only for, and thus are not limitative of the present invention, and wherein.

DETAILED DESCRIPTION OF THE INVENTION

In order to make the objectives, structures, features, and functions of the present invention more comprehensible, preferred embodiments accompanied with figures are described in detail below.

Figure 1A:
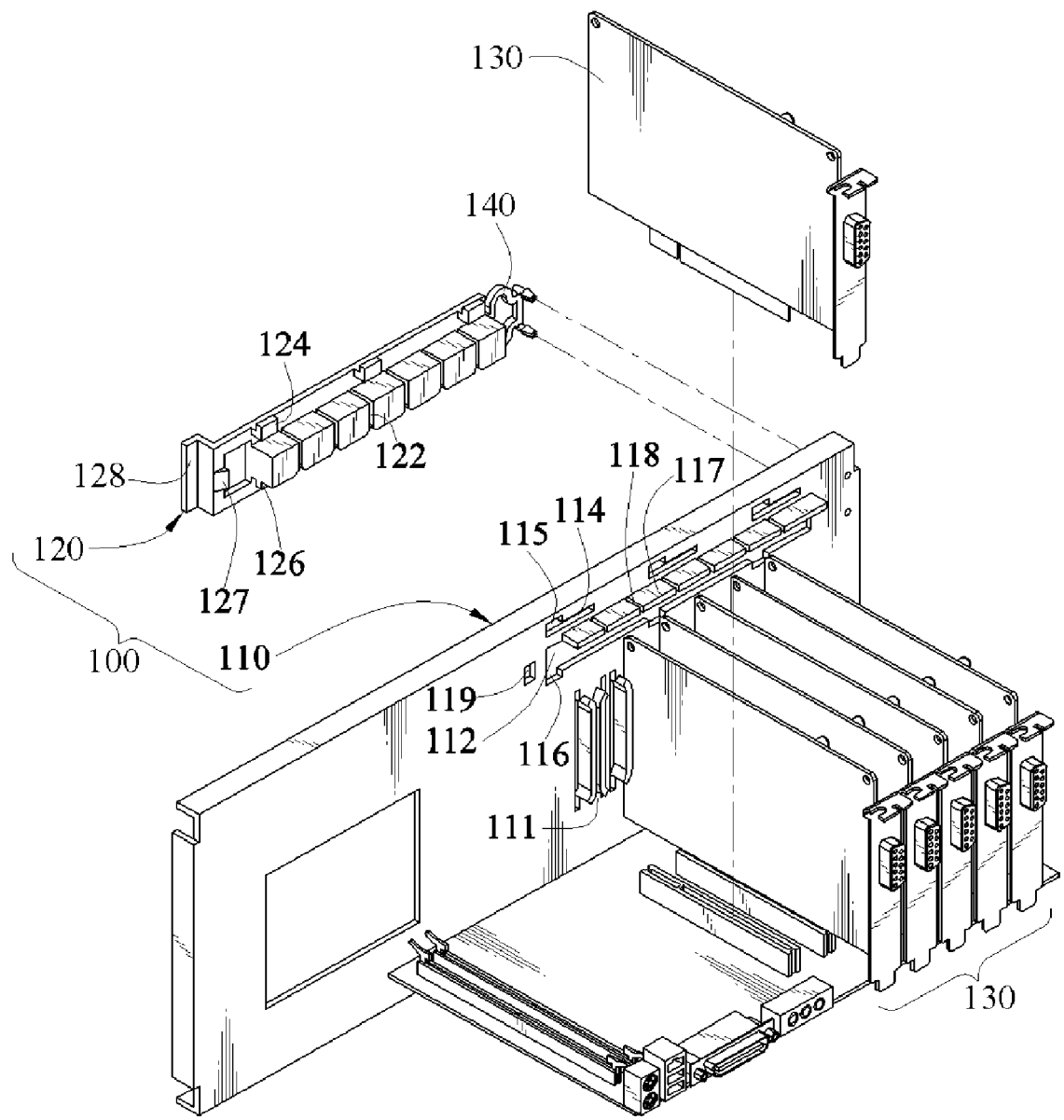
FIG. 1A is an exploded view of the fixing device according to an embodiment of the present invention.
Figure 1B:
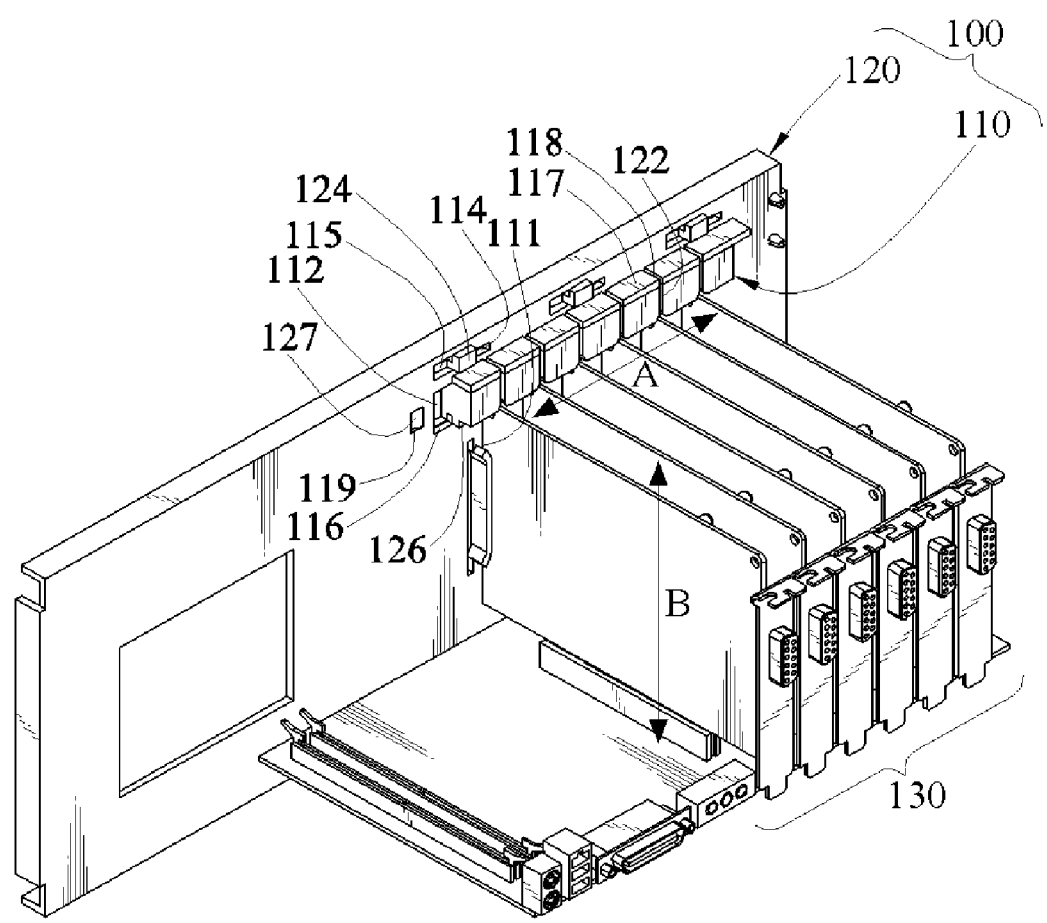
FIG. 1B is a perspective view of the fixing device according to the embodiment of the present invention.

First, referring to FIGS. 1A and 1B, a fixing device 100 of an embodiment of the present invention is disposed in a case of a computer, for fixing front ends of a plurality of interface cards 130 at the same time. Each of the interface cards 130 are installed to an expansion slot (not shown) of a circuit board (motherboard) through an installation path B. The fixing device 100 includes a plate 110 and a pressing element 120. The plate 110 is disposed corresponding to a front end of each of the interface cards 130. The plate 110 is a separate element disposed in the case, or is a part of the case. The plate 110 further includes a plurality of guide slots 111 formed on the surface of the plate 110 and corresponding to the front end of the interface cards 130. The front end of each interface cards 130 contacts the plate 110 and slides in the corresponding guide slot 111. Therefore, the guide slots 111 guide the front ends of the interface cards 130 to move along the installation paths B of the interface cards 130 to be installed or uninstalled from the circuit board.

Referring to FIGS. 1A and 1B again, the pressing element 120 is movably disposed on the plate 110 along a sliding path A, and a bottom surface of the pressing element 120 is used to press the interface cards 130. The sliding path of the pressing element 120 is perpendicular to the installation path of the interface cards 130. The pressing element 120 is provided for being moved between a fixing position to pressing the interface cards 130 and a releasing position for the interface card being installed or uninstalled. The pressing element 120 further has a plurality of grooves 122. When the pressing element 120 is moved to the releasing position, each of the grooves 122 overlaps an installation path B of one of the interface cards 130, for the interface cards 130 to pass through. In other words, when the pressing element 120 is moved to the releasing position, the grooves 122 align with the installation path of the interface cards 130, such that the interface cards 130 can be moved through the grooves.

Referring to FIGS. 1A and 1B, the plate 110 further has a sliding slot 112, a plurality of positioning slits 114, a plurality of first notches 115, and a plurality of second notches 116. The sliding slot 112 is used for the pressing element 120 to be disposed and slide therein. The plurality of positioning slits 114 is disposed above the sliding slot 112. Each first notch 115 is formed at one end of each positioning slit 114, and each second notch 116 is formed at a bottom edge of the sliding slot 112.

Referring to FIGS. 1A and 1B again, the pressing element 120 of the fixing device 100 further has a trigger portion 128, a plurality of first latching pieces 124, and a plurality of second latching pieces 126. The trigger portion 128 extends and formed at an end portion of the pressing element 120, for a user to trigger the move of the pressing element 120. The first latching pieces 124 are formed at a top edge of the pressing element 120, and the second latching pieces 126 are formed at the bottom edge of the pressing element 120.

As shown in FIGS. 1A and 1B, in this embodiment of the present invention, the first notches 115 of the plate are used for the first latching pieces 124 of the pressing element 120 to pass through, such that the first latching pieces 124 are engaged and slide in the positioning slits 114. The second notches 116 of the plate 110 are used for the second latching pieces 126 to pass through, so as to be hooked and slide on the bottom edge of the sliding slot 112, such that the pressing element 120 will be movably disposed and slide on the plate 110 and will not be disengaged from the plate 110.

Figure 2:
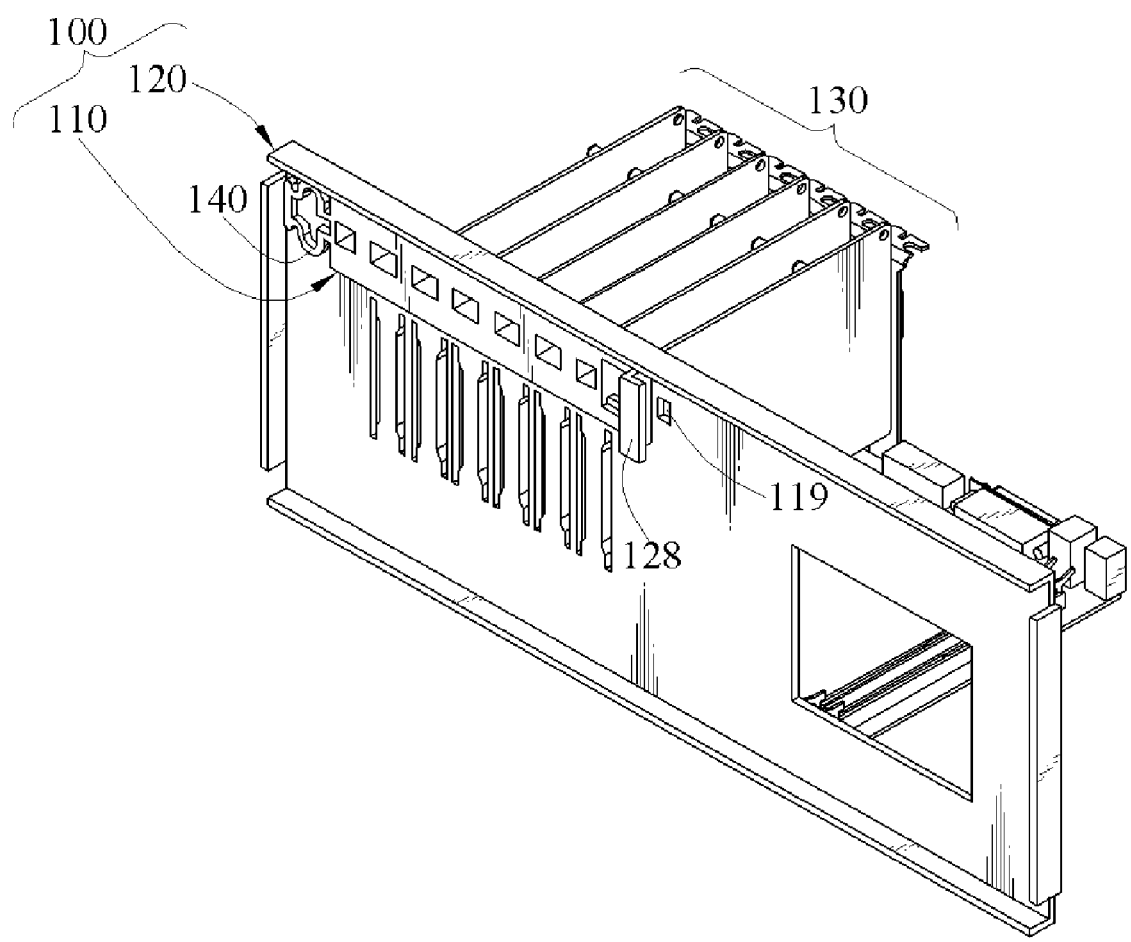
FIG. 2 is another perspective view showing the rear side of the fixing device according to the embodiment of the present invention.

Next, referring to FIGS. 1A, 1B and 2, the fixing device 100 further has an elastic member 140, in which one end of the elastic member 140 is connected to the other end portion of the pressing element 120, and the other end of the elastic member 140 is fixed on the plate 110. Therefore, the elastic member 140 pushes the pressing element to make the grooves 122 leave the installation paths B of the interface cards 130 through the resilience thereof, i.e., indicated by the arrow direction in FIG. 2, the pressing element 120 restores the pressing state. The elastic member 140 is a separate member connected to and fixed on the pressing element 120, or is monolithically formed with the pressing element 120. Moreover, a clamp 127 is formed at the end portion of the pressing element 120, and a hole 119 is further formed in the plate 110. When the grooves 122 of the pressing element 120 overlap the installation paths B of the interface cards 130, the clamp 127 is engaged in the hole 119, thereby keeping the pressing element 120 at the releasing position and keeping the grooves 122 overlap the installation paths B of the interface cards 130, as shown in FIG. 1B, such that the pressing element 120 is in a release state.

Referring to FIGS. 1A and 1B again, the plate 110 of the fixing device 100 of the present invention further has a flange 117 formed at the top edge of the sliding slot 112, so as to assist supporting and fixing of the pressing element 120. A plurality of recesses 118 is further formed on the flange 117, and the recesses 118 are located on the installation paths of the interface cards 130, for the interface cards 130 to pass through.

Figure 3:
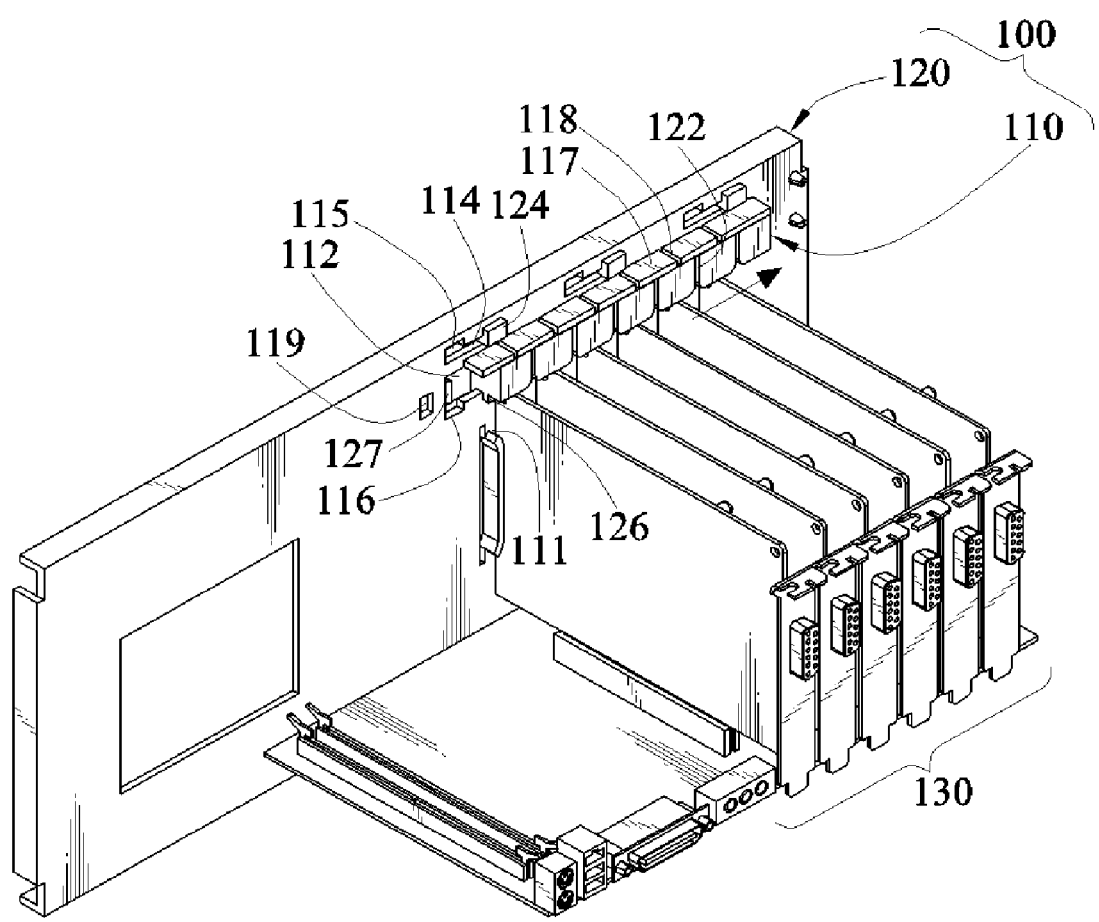
FIG. 3 is another perspective view of the fixing device according to the embodiment of the present invention, showing the pressing element at the fixing position and presses the interface card.

Referring to FIGS. 1B and 3, when the first latching pieces 124 and second latching pieces 126 of the pressing element 120 are respectively engaged in the positioning slits 114 and the bottom edge of the sliding slot 112, the pressing element 120 may be disposed on the sliding slot 112. Moreover, as the first latching pieces 124 and second latching pieces 126 respectively slide in the positioning slits 114 and on the bottom edge of the sliding slot 112, the pressing element 120 slides in the sliding slot 112. When the pressing element 120 is moved to the releasing position and the grooves 122 of the pressing element 120 overlap the installation paths of the interface cards 130, the interface cards 130 can pass through the grooves 122 to be installed or uninstalled, as shown in FIG. 1B. When the pressing element is moved to the fixing position under an external force or the resilience of the elastic member 140 and the grooves 122 leave the installation paths B of the interface cards 130, the interface cards 130 are pressed by the pressing element 120, as shown in FIG. 3.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fixing device, for fixing at least one interface card, wherein the interface card is disposed on a circuit board through an installation path, the fixing device comprising:
   a plate; and
   a pressing element having at least one groove, the pressing element movably disposed on the plate along a sliding path, the sliding path being perpendicular to the installation path, the pressing element being capable of moving between a fixing position where the pressing element presses the interface card and a releasing position where the groove of the pressing element is aligned with the installation path, so that the interface card may be moved through the groove.

2. The fixing device as claimed in claim 1, wherein the plate further includes a sliding slot for the pressing element to be disposed and slide therein.

3. The fixing device as claimed in claim 1, wherein the plate further includes at least one positioning slit, and the pressing element further includes at least one first latching piece engaged and sliding in the positioning slit.

4. The fixing device as claimed in claim 3, wherein the plate further includes at least one first notch formed at one end of the positioning slit, for the first latching piece to enter and be engaged in the positioning slit.

5. The fixing device as claimed in claim 2, wherein the pressing element further includes at least one second latching piece hooked and sliding on one side edge of the slide slot.

6. The fixing device as claimed in claim 5, wherein the plate further includes at least one second notch formed at the side edge of the slide slot, for the second latching piece to enter and be hooked on the side edge of the slide slot.

7. The fixing device as claimed in claim 1, further comprising an elastic member connecting the pressing element and the plate, for pushing the pressing element to make the groove leave the installation path of the interface card.

8. The fixing device as claimed in claim 1, wherein the pressing element further includes a trigger portion extending and formed an end portion of the pressing element, for a user to trigger the move of the pressing element.

9. The fixing device as claimed in claim 1, wherein the plate further includes a flange formed at a top edge of the slide slot, the flange is formed with at least one recess, and the recess is located on the installation path of the interface card.

10. The fixing device as claimed in claim 1, wherein the plate further includes at least one guide slot formed on a surface of the plate and corresponding to an end of the interface card, for guiding one end of the interface card to be moved along the installation path.

11. The fixing device as claimed in claim 1, wherein the plate further comprises a hole defined therein, and the pressing element further comprises a clamp formed at one end of the pressing element, the clamp being for engaging in the hole.

\* \* \* \* \*